(12) United States Patent
Yamamoto et al.

(10) Patent No.: US 11,153,510 B2
(45) Date of Patent: Oct. 19, 2021

(54) DISPLAY CONTROL DEVICE

(71) Applicant: AISIN SEIKI KABUSHIKI KAISHA, Kariya (JP)

(72) Inventors: Kinji Yamamoto, Kariya (JP); Kazuya Watanabe, Kariya (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 1 day.

(21) Appl. No.: 16/751,625

(22) Filed: Jan. 24, 2020

(65) Prior Publication Data
US 2020/0244897 A1 Jul. 30, 2020

(30) Foreign Application Priority Data

Jan. 25, 2019 (JP) .............................. JP2019-011693

(51) Int. Cl.
| | |
|---|---|
| *G06T 15/00* | (2011.01) |
| *H04N 5/272* | (2006.01) |
| *G06T 11/00* | (2006.01) |
| *B60R 1/00* | (2006.01) |

(52) U.S. Cl.
CPC ............. *H04N 5/272* (2013.01); *B60R 1/002* (2013.01); *G06T 11/001* (2013.01); *G06T 15/00* (2013.01); *B60R 2300/105* (2013.01); *B60R 2300/302* (2013.01); *B60R 2300/304* (2013.01); *B60R 2300/307* (2013.01)

(58) Field of Classification Search
None
See application file for complete search history.

(56) References Cited

U.S. PATENT DOCUMENTS

| | | | |
|---|---|---|---|
| 6,556,198 B1* | 4/2003 | Nishikawa | ............ G06T 17/20 345/420 |
| 6,898,495 B2 | 5/2005 | Tanaka et al. | |
| 7,161,616 B1 | 1/2007 | Okamoto et al. | |
| 9,321,400 B2 | 4/2016 | Wakabayashi et al. | |
| 2018/0058879 A1* | 3/2018 | Tayama | ................ B60W 30/12 |
| 2019/0075268 A1 | 3/2019 | Goto et al. | |
| 2020/0111445 A1* | 4/2020 | Bianchi | ............. G02B 27/0101 |

FOREIGN PATENT DOCUMENTS

| | | |
|---|---|---|
| JP | 3300334 B2 | 7/2002 |
| JP | 3947375 B2 | 7/2007 |
| JP | 5522492 B2 | 6/2014 |
| JP | 2017-175182 A | 9/2017 |

* cited by examiner

*Primary Examiner* — Yi Wang
(74) *Attorney, Agent, or Firm* — Sughrue Mion, PLLC

(57) ABSTRACT

A display control device includes: an image data acquisition unit configured to acquire image data as a result of imaging by an imaging unit that images a situation around a vehicle; and a display processing unit configured to display, on a display unit, a peripheral image indicating the situation around the vehicle generated based on the image data and also display, on the peripheral image, a first vehicle image indicating a current state of the vehicle and a second vehicle image indicating a future state of the vehicle when the vehicle moves toward a target position and to change a display mode of at least one of the first vehicle image and the second vehicle image according to a remaining distance to the target position of the vehicle.

10 Claims, 8 Drawing Sheets

DISPLAY CONTROL DEVICE

CROSS REFERENCE TO RELATED APPLICATIONS

This application is based on and claims priority under 35 U.S.C. § 119 to Japanese Patent Application 2019-011693, filed on Jan. 25, 2019, the entire contents of which are incorporated herein by reference.

TECHNICAL FIELD

This disclosure relates to a display control device.

BACKGROUND DISCUSSION

In the related art, various techniques have been studied to visually notify a vehicle occupant of a situation around a vehicle using image data as a result of imaging by an imaging unit that images the situation around the vehicle. See, e.g., JP 3300334B (Reference 1), JP 2017-175182A (Reference 2), JP 3947375B (Reference 3), and JP 5522492B (Reference 4).

In the conventional techniques as described above, for example, when the vehicle moves toward a target position, it is necessary to notify the occupant of the mode of movement of the vehicle to the target position along with the situation around the vehicle in an easy-to-understand manner.

Thus, a need exists for a display control device which is not susceptible to the drawback mentioned above.

SUMMARY

A display control device as an aspect of this disclosure includes an image data acquisition unit configured to acquire image data as a result of imaging by an imaging unit that images a situation around a vehicle and a display processing unit configured to display, on a display unit, a peripheral image indicating the situation around the vehicle generated based on the image data and also display, on the peripheral image, a first vehicle image indicating a current state of the vehicle and a second vehicle image indicating a future state of the vehicle when the vehicle moves toward a target position and to change a display mode of at least one of the first vehicle image and the second vehicle image according to a remaining distance to the target position of the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments and modifications disclosed here will be described with reference to the drawings. Configurations of the embodiments described later and actions, results, and effects provided by the configurations are given by way of example and are not limited to the following description.

EMBODIMENT

Figure 1:
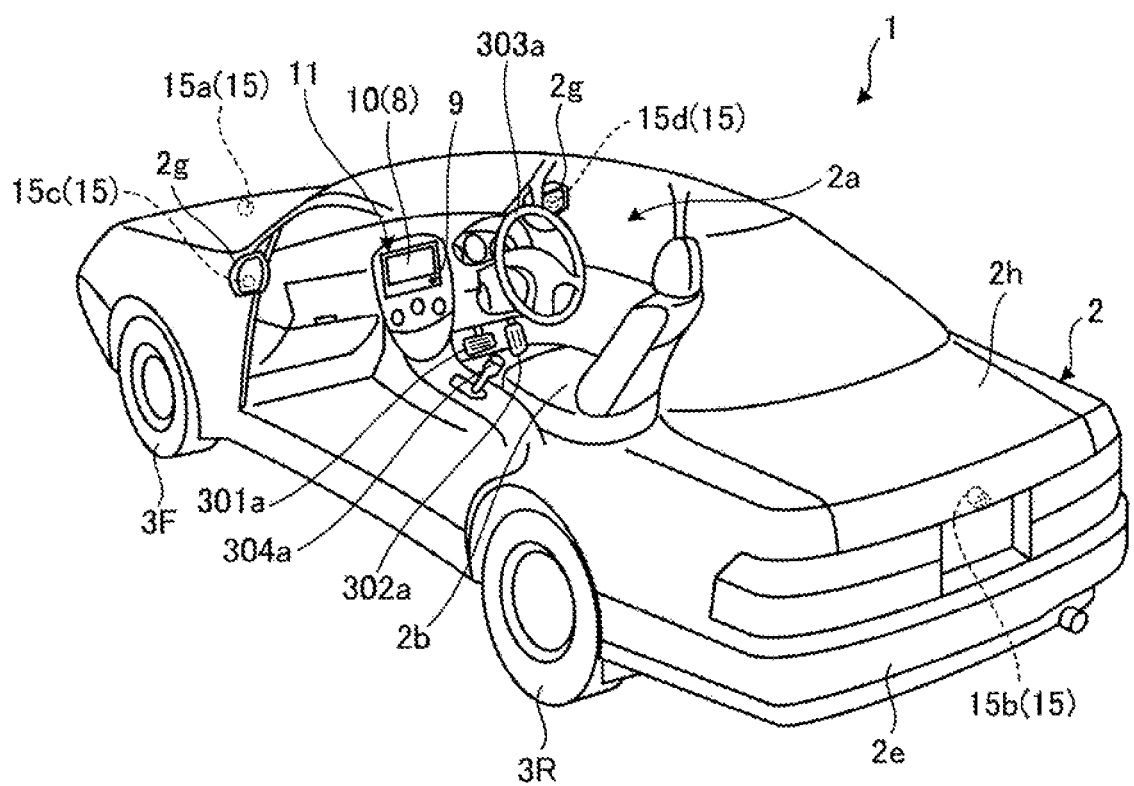
FIG. 1 is an exemplary and schematic diagram illustrating a configuration in a vehicle room of a vehicle according to an embodiment.
Figure 2:
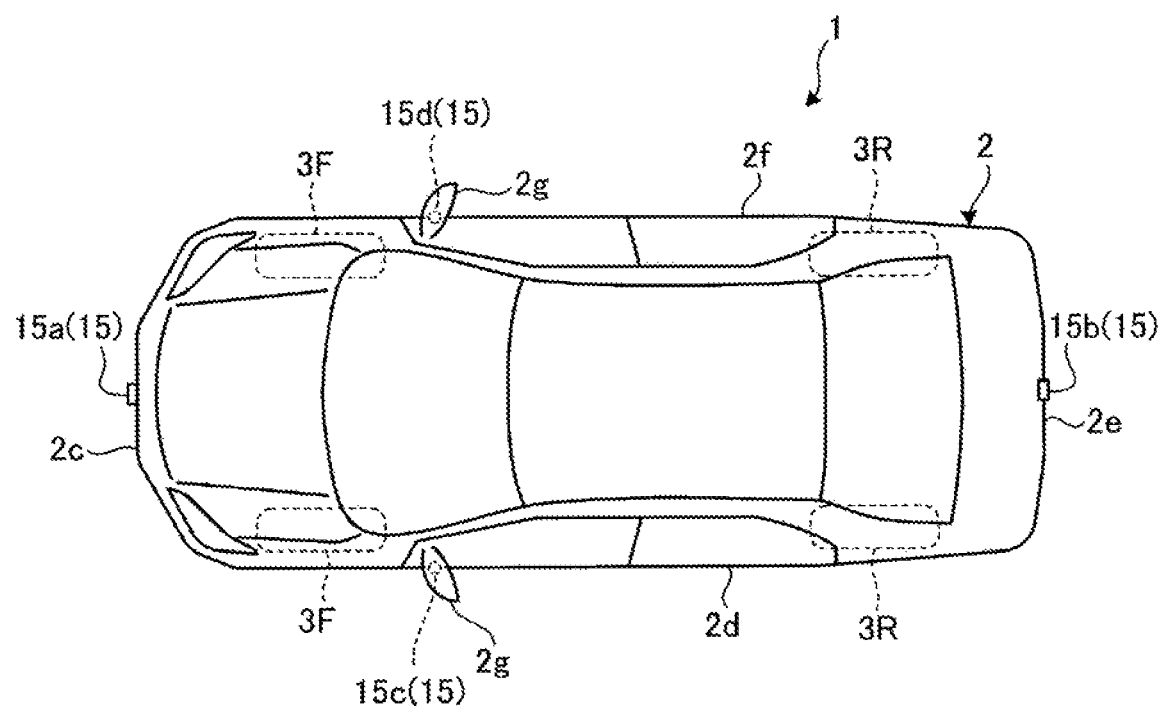
FIG. 2 is an exemplary and schematic diagram illustrating an appearance of the vehicle according to the embodiment as viewed from above.

First, a schematic configuration of a vehicle 1 according to an embodiment will be described with reference to FIGS. 1 and 2. FIG. 1 is an exemplary and schematic diagram illustrating a configuration in a vehicle room 2a of the vehicle 1 according to the embodiment, and FIG. 2 is an exemplary and schematic diagram illustrating an appearance of the vehicle 1 according to the embodiment as viewed from above.

As illustrated in FIG. 1, the vehicle 1 according to the embodiment includes the vehicle room 2a in which an occupant including a driver as a user gets. In the vehicle room 2a, a braking unit (braking operation unit) 301a, an acceleration unit (acceleration operation unit) 302a, a steering unit 303a, a transmission unit (transmission operation unit) 304a, and the like are provided in a state where the user may operate these units from a seat 2b.

The braking unit 301a is, for example, a brake pedal provided under the driver's foot, and the acceleration unit 302a is, for example, an accelerator pedal provided under the driver's foot. Further, the steering unit 303a is, for example, a steering wheel protruding from a dashboard (instrument panel), and the transmission unit 304a is, for example, a shift lever protruding from a center console. In addition, the steering unit 303a may be a steering wheel.

A monitor device 11 which includes a display unit 8 capable of outputting various images and a voice output unit 9 capable of outputting various voices is provided in the vehicle room 2a. The monitor device 11 is provided on, for example, a central portion in the width direction (transverse direction) of the dashboard in the vehicle room 2a. In addition, the display unit 8 is configured with, for example, a liquid crystal display (LCD) or an organic electroluminescent display (OELD).

Here, an operation input unit 10 is provided on a display screen of the display unit 8 as an area in which an image is displayed. For example, the operation input unit 10 is configured as a touch panel that may detect the coordinates of a position where an indicator such as a finger or a stylus approaches (including contact). Thus, the user (driver) may view the image displayed on the display screen of the display unit 8 and may execute various operation inputs by performing a touch (tap) operation using the indicator on the operation input unit 10.

In addition, in the embodiment, the operation input unit 10 may be any of various physical interfaces such as a switch, a dial, a joystick, or a push button. Further, in the embodiment, another voice output device may be provided at a position different from the position of the monitor device 11 in the vehicle room 2a. In this case, various pieces of voice information may be output from both the voice output unit 9 and the other voice output device. Further, in the embodiment, the monitor device 11 may be configured to be able to display information related to various systems such as a navigation system and an audio system.

Further, as illustrated in FIGS. 1 and 2, the vehicle 1 according to the embodiment is configured as a four-wheel vehicle having two left and right front wheels 3F and two right and left rear wheels 3R. Hereinafter, for simplicity, the front wheels 3F and the rear wheels 3R may be collectively referred to as wheels. In the embodiment, the side slip angles of some or all of the four wheels are changed (steered) according to an operation of the steering unit 303a.

Further, the vehicle 1 is equipped with multiple (four in the example illustrated in FIGS. 1 and 2) in-vehicle cameras 15a to 15d as a periphery monitoring imaging unit. The in-vehicle camera 15a is provided on a rear end 2e of a vehicle body 2 (e.g., below a door 2h of a rear trunk) and images the area behind the vehicle 1. Further, the in-vehicle camera 15b is provided on a door mirror 2g on a right end 2f of the vehicle body 2 and images the area at the right side of the vehicle 1. Further, the in-vehicle camera 15c is provided on a front end 2c (e.g., a front bumper) of the vehicle body 2 and images the area in front of the vehicle 1. Further, the in-vehicle camera 15d is provided on the door mirror 2g on a left end 2d of the vehicle body 2 and images the area at the left side of the vehicle 1. Hereinafter, for simplicity, the in-vehicle cameras 15a to 15d may be collectively referred to as an in-vehicle camera 15.

The in-vehicle camera 15 is a so-called digital camera having an imaging device such as a charge coupled device (CCD) or complementary metal oxide semiconductor (CMOS) image sensor (CIS). The in-vehicle camera 15 performs imaging of the surroundings of the vehicle 1 at a predetermined frame rate, and outputs image data of a captured image obtained by the imaging. The Image data obtained by the in-vehicle camera 15 may constitute a video image as a frame image.

Next, a system configuration provided to realize various controls in the vehicle 1 according to the embodiment will be described with reference to FIG. 3. In addition, the system configuration illustrated in FIG. 3 is merely an example and thus, may be set (changed) in various ways.

Figure 3:
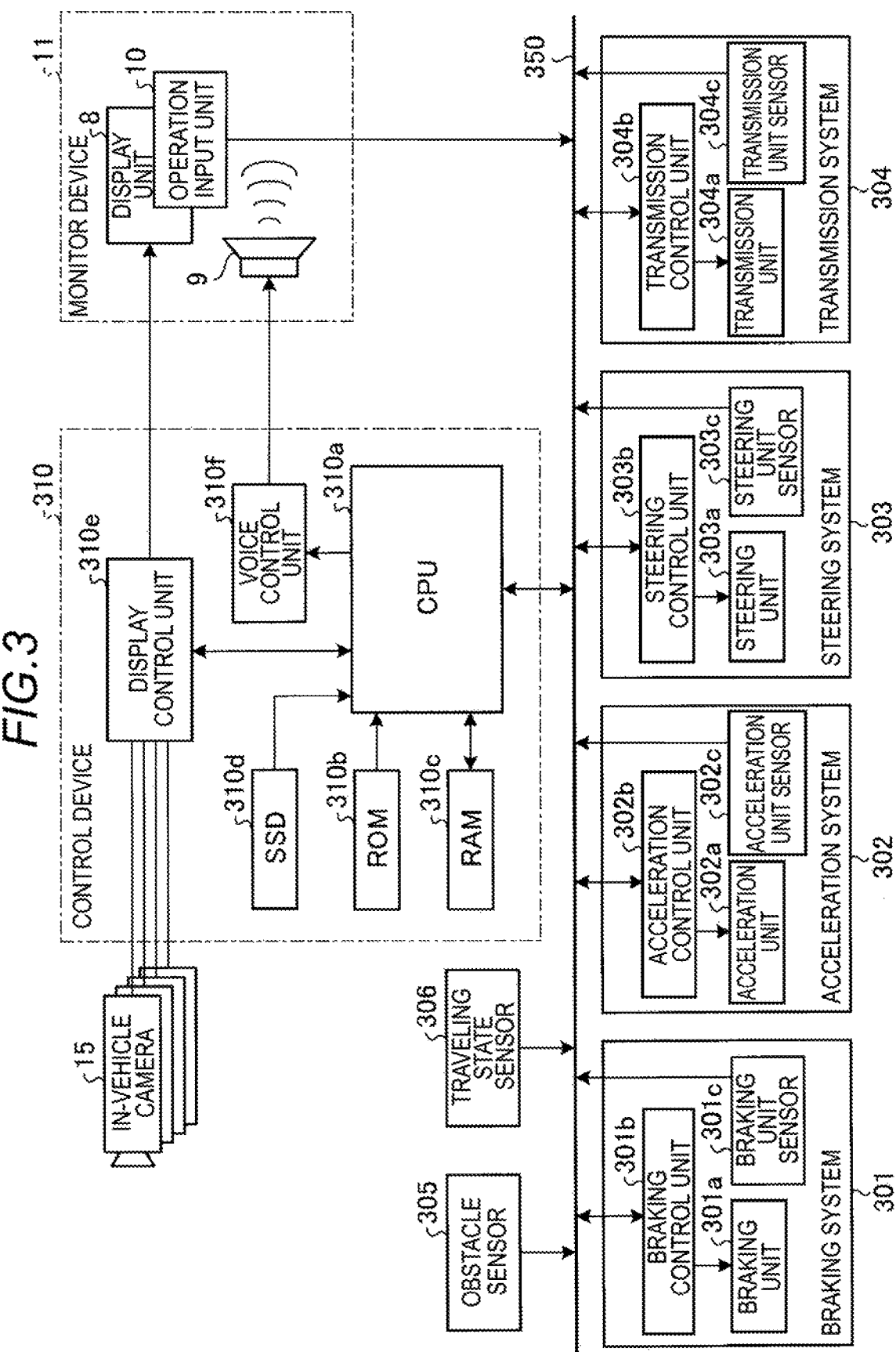
FIG. 3 is an exemplary and schematic block diagram illustrating a system configuration of the vehicle according to the embodiment.

FIG. 3 is an exemplary and schematic block diagram illustrating a system configuration of the vehicle 1 according to the embodiment. As illustrated in FIG. 3, the vehicle 1 according to the embodiment includes a braking system 301, an acceleration system 302, a steering system 303, a transmission system 304, an obstacle sensor 305, a traveling state sensor 306, the in-vehicle camera 15, the monitor device 11, a control device 310, and an in-vehicle network 350.

The braking system 301 controls the deceleration of the vehicle 1. The braking system 301 includes the braking unit 301a, a braking control unit 301b, and a braking unit sensor 301c.

The braking unit 301a is, for example, a device for decelerating the vehicle 1 such as the brake pedal described above.

The braking control unit 301b is configured as, for example, a microcomputer having a hardware processor such as a central processing unit (CPU). The braking control unit 301b controls the degree of deceleration of the vehicle 1 by driving an actuator (not illustrated) based on, for example, an instruction input via the in-vehicle network 350 and operating the brake unit 301a.

The braking unit sensor 301c is a sensing device for detecting the state of the braking unit 301a. For example, when the braking unit 301a is configured as the brake pedal, the braking unit sensor 301c detects the position of the brake pedal or the pressure acting on the brake pedal as the state of the braking unit 301a. The braking unit sensor 301c outputs the detected state of the braking unit 301a to the in-vehicle network 350.

The acceleration system 302 controls the acceleration of the vehicle 1. The acceleration system 302 includes the acceleration unit 302a, an acceleration control unit 302b, and an acceleration unit sensor 302c.

The acceleration unit 302a is, for example, a device for accelerating the vehicle 1 such as the accelerator pedal described above.

The acceleration control unit 302b is configured as a microcomputer having a hardware processor such as a CPU, for example. The acceleration control unit 302b controls the degree of acceleration of the vehicle 1 by driving an actuator (not illustrated) based on, for example, an instruction input via the in-vehicle network 350 and operating the acceleration unit 302a.

The acceleration unit sensor 302c is a sensing device for detecting the state of the acceleration unit 302a. For example, when the acceleration unit 302a is configured as the accelerator pedal, the acceleration unit sensor 302c detects the position of the accelerator pedal or the pressure acting on the accelerator pedal. The acceleration unit sensor 302c outputs the detected state of the acceleration unit 302a to the in-vehicle network 350.

The steering system 303 controls the advancing direction of the vehicle 1. The steering system 303 includes the steering unit 303a, a steering control unit 303b, and a steering unit sensor 303c.

The steering unit 303a is, for example, a device for steering the steered wheels of the vehicle 1 such as the above-described steering wheel or a handle.

The steering control unit 303b is configured as, for example, a microcomputer having a hardware processor such as a CPU. The steering control unit 303b controls the advancing direction of the vehicle 1 by driving an actuator (not illustrated) based on, for example, an instruction input via the in-vehicle network 350 and operating the steering unit 303a.

The steering unit sensor 303c is a sensing device for detecting the state of the steering unit 303a, i.e., a steering angle sensor for detecting the steering angle of the vehicle 1. For example, when the steering unit 303a is configured as the steering wheel, the steering unit sensor 303c detects the position of the steering wheel or the rotation angle of the steering wheel. In addition, in a case where the steering unit 303a is configured as the handle, the steering unit sensor 303c may detect the position of the handle or the pressure acting on the handle. The steering unit sensor 303c outputs the detected state of the steering unit 303a to the in-vehicle network 350.

The transmission system 304 controls the transmission ratio of the vehicle 1. The transmission system 304 includes the transmission unit 304a, a transmission control unit 304b, and a transmission unit sensor 304c.

The transmission unit 304a is, for example, a device for changing the transmission ratio of the vehicle 1 such as the shift lever described above.

The transmission control unit 304b is configured as, for example, a computer having a hardware processor such as a CPU. The transmission control unit 304b controls the transmission ratio of the vehicle 1 by driving an actuator (not illustrated) based on, for example, an instruction input via the in-vehicle network 350 and operating the transmission unit 304a.

The transmission unit sensor 304c is a sensing device for detecting the state of the transmission unit 304a. For example, when the transmission unit 304a is configured as the shift lever, the transmission unit sensor 304c detects the position of the shift lever or the pressure acting on the shift lever. The transmission unit sensor 304c outputs the detected state of the transmission unit 304a to the in-vehicle network 350.

The obstacle sensor 305 is a sensing device for detecting information related to an object (obstacle) that may exist around the vehicle 1. The obstacle sensor 305 includes, for example, a distance measurement sensor that acquires the distance to an object existing around the vehicle 1. Examples of the distance measurement sensor include a sonar that obtains the distance by transmitting voice waves and receiving the voice waves reflected by the object existing around the vehicle 1 or a laser radar that obtains the distance by transmitting radio waves such as light and receiving the radio waves reflected by the object existing around the vehicle 1. The obstacle sensor 305 outputs the detected information to the in-vehicle network 350.

The traveling state sensor 306 is a device for detecting the traveling state of the vehicle 1. The traveling state sensor 306 includes, for example, a wheel speed sensor that detects the wheel speed of the vehicle 1, an acceleration sensor that detects the longitudinal or transverse acceleration of the vehicle 1, or a gyro sensor that detects the turning speed (angular velocity) of the vehicle 1. The traveling state sensor 306 outputs the detected traveling state to the in-vehicle network 350.

The control device 310 is a device that comprehensively controls various systems provided in the vehicle 1. Although details will be described later, the control device 310 according to the embodiment has a function of generating a peripheral image indicating a situation around the vehicle 1 based on image data as a result of imaging by the in-vehicle camera 15 and displaying the generated peripheral image on the display unit 8. In addition, the peripheral image mentioned here includes, for example, a bird's eye view image obtained by looking down at the situation around the vehicle 1 (including the vehicle 1) from above, a three-dimensional image obtained by three-dimensionally viewing the situation around the vehicle 1 (including the vehicle 1) from an arbitrary viewpoint, or single camera image that is an image based only on one image data acquired from one in-vehicle camera 15.

The control device 310 is configured as an electronic control unit (ECU) including a central processing unit (CPU) 310a, a read only memory (ROM) 310b, a random access memory (RAM) 310c, a solid state drive (SSD) 310d, a display control unit 310e, and a voice control unit 310f.

The CPU 310a is a hardware processor that comprehensively controls the control device 310. The CPU 310a reads out various control programs (computer programs) stored in the ROM 310b and the like, and realizes various functions according to instructions defined in the various control programs. In addition, the various control programs mentioned here include a display control program for realizing a display control processing of displaying the peripheral image described above, a real vehicle image, and a virtual vehicle image.

The ROM 310b is a nonvolatile main storage device that stores parameters required for the execution of the various control programs described above.

The RAM 310c is a volatile main storage device that provides an operating area for the CPU 310a.

The SSD 310d is a rewritable nonvolatile auxiliary storage device. In addition, the control device 310 according to the embodiment may be provided with a hard disk drive (HDD) as an auxiliary storage device instead of the SSD 310d (or in addition to the SSD 310d).

The display control unit 310e mainly performs an image processing on a captured image obtained from the in-vehicle camera 15 or the generation of image data to be output to the display unit 8 of the monitor device 11 among various types of processings that may be executed by the control device 310.

The voice control unit 310f mainly performs, the generation of voice data to be output to the voice output unit 9 of the monitor device 11 among various processes that may be executed by the control device 310.

The in-vehicle network 350 interconnects the braking system 301, the acceleration system 302, the steering system 303, the transmission system 304, the obstacle sensor 305, the traveling state sensor 306, the operation input unit 10 of the monitor device 11, and the control device 310 so as to enable communication therebetween.

By the way, various techniques have been conventionally studied to notify the occupant of the situation around the vehicle 1 using the peripheral image described above, but in these techniques, for example, when the vehicle 1 moves toward a target position, it is necessary to notify the occupant of the mode of movement of the vehicle 1 to the target position along with the situation around the vehicle 1 in an easy-to-understand manner.

Figure 4:
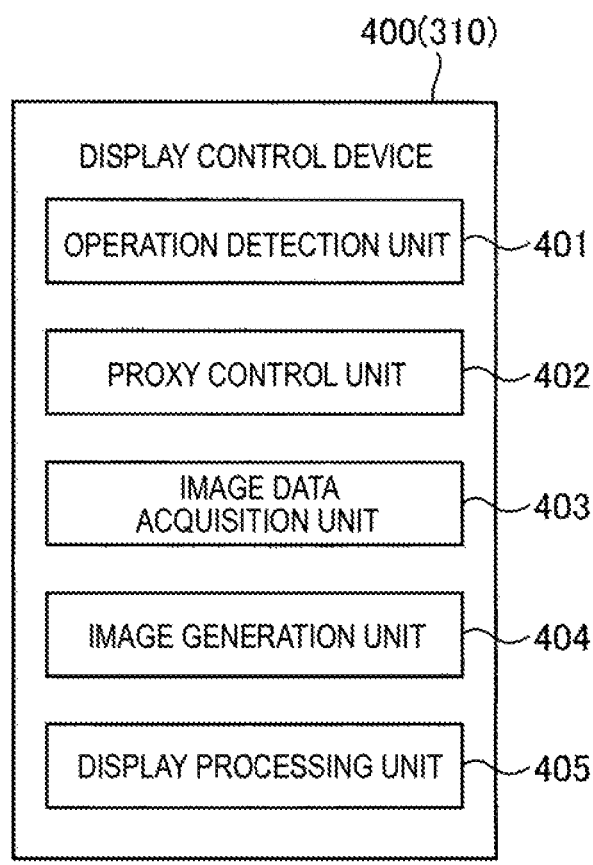
FIG. 4 is an exemplary and schematic block diagram illustrating functions of a display control device according to the embodiment.

Accordingly, by realizing, in the control device 310, a display control device 400 having functions illustrated in FIG. 4, the embodiment realizes to notify the occupant of the mode of movement of the vehicle 1 to the target position along with the situation around the vehicle 1 in an easy-to-understand manner.

FIG. 4 is an exemplary and schematic block diagram illustrating functions of the display control device 400 according to the embodiment. The functions illustrated in FIG. 4 are realized in the control device 310 by cooperation of software and hardware. That is, the functions illustrated in FIG. 4 are realized as a result of the CPU 310a of the control device 310 reading out and executing a predetermined control program (camera parameter estimation program) stored in the ROM 310b and the like. In addition, in the embodiment, some of the functions illustrated in FIG. 4 may be realized by dedicated hardware (circuits).

As illustrated in FIG. 4, the display control device 400 according to the embodiment includes an operation detection unit 401, a proxy control unit 402, an image data acquisition unit 403, an image generation unit 404, and a display processing unit 405.

The operation detection unit 401 detects various operations executed on the vehicle 1. For example, the operation detection unit 401 detects an operation (such as a touch operation) input via the operation input unit 10 of the monitor device 11.

The proxy control unit 402 executes proxy control of executing at least a part of a driving operation of the vehicle 1 by the driver by appropriately controlling the braking system 301, the acceleration system 302, the steering system 303, and the transmission system 304 described above. According to the proxy control, the movement of the vehicle 1 to the target position may be realized automatically (or semi-automatically) without depending on only the driving operation by the driver. In addition, examples of the proxy control include automatic parking control and the like. As the target position that may be set in the automatic parking control, a parking position where the vehicle 1 finally arrives or a quick-turn position where there is a possibility of the vehicle 1 temporarily stopping before reaching the parking position is conceivable. In the embodiment, the proxy control unit 402 may be realized in a dedicated ECU that comprehensively controls the traveling control of the vehicle 1, separately from the control device 310 that constitutes the display control device 400. In addition, it goes without saying that the technique of the embodiment may also be used for proxy control other than automatic parking control.

The image data acquisition unit 403 acquires, from the in-vehicle camera 15, image data as a result of imaging by the in-vehicle camera 15.

The image generation unit 404 generates an image to be displayed on the display unit 8 of the monitor device 11 based on the image data acquired by the image data acquisition unit 403.

The display processing unit 405 controls the display content of the display unit 8 of the monitor device 11 based on the image generated by the image generation unit 404. More specifically, when the vehicle 1 moves toward the target position, the display processing unit 405 displays a peripheral image indicating the situation around the vehicle 1 in a display mode illustrated in, for example, FIG. 5 on the display unit 8 and displays (superimposes) a real vehicle image indicating the current state of the vehicle 1 and a virtual vehicle image indicting the future state of the vehicle 1 on the peripheral image.

Figure 5:
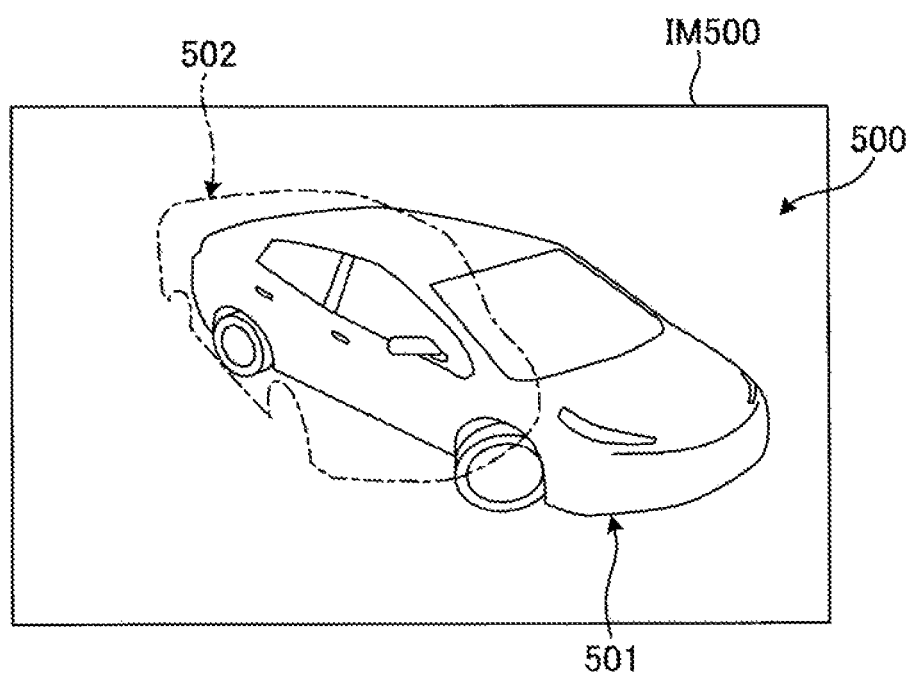
FIG. 5 is an exemplary and schematic diagram illustrating an example of a real vehicle image and a virtual vehicle image displayed on a peripheral image according to the embodiment.

FIG. 5 is an exemplary and schematic diagram illustrating an example of a real vehicle image and a virtual vehicle image displayed on a peripheral image according to the embodiment. In addition, hereinafter, an example in which a three-dimensional image is used as a peripheral image will be mainly described, but, in the embodiment, as described above, the peripheral image also includes a bird's eye view image or a single camera image, in addition to the three-dimensional image. Thus, in the embodiment, the real vehicle image and the virtual vehicle image may also be superimposed on the bird's eye view image or the single camera image.

As illustrated in FIG. 5, in the embodiment, the display processing unit 405 displays, on the display unit 8, an image IM500 including, for example, an image 500 representing a three-dimensional image as an example of a peripheral image, an image 501 representing a real vehicle image indicating the current state (e.g., position, orientation, or shape) of the vehicle 1 at a viewpoint corresponding to the image 500, and an image 502 representing a virtual vehicle image indicating the future state of the vehicle 1 (when the movement of the vehicle 1 proceeds for a certain time or by a certain distance) at a viewpoint corresponding to the image 500.

In addition, in the embodiment, the display processing unit 405 may generate the real vehicle image and the virtual vehicle image after differentiating, for example, the shape, color, brightness, or transmittance thereof such that the virtual vehicle image is not confused with information indicating the current state of the vehicle 1. For example, as in the example illustrated in FIG. 5, the display processing unit 405 may generate the image 501 representing the real vehicle image based on the overall shape of the vehicle 1 including wheels, and may generate the image 502 representing the virtual vehicle image based on the shape of the vehicle body 2 of the vehicle 1 including no wheels.

Furthermore, although details will be described later, in the embodiment, the display processing unit 405 may display a real vehicle image and a virtual vehicle image, for example, as 3D polygons. In this case, the display processing unit 405 may selectively switch between displaying an overlapping portion between a real vehicle image and a virtual vehicle image in a display mode in which either one of the real vehicle image and the virtual vehicle image is identifiable by executing a hidden surface removal processing on the overlapping portion and displaying the overlapping portion between the real vehicle image and the virtual vehicle image in a display mode in which both the real vehicle image and the virtual vehicle image are identifiable by executing no hidden surface removal processing on the overlapping portion.

According to the above-described peripheral image on which the real vehicle image and the virtual vehicle image are superimposed, since the current state of the vehicle 1 and the situation around the vehicle 1 may be notified, including the future state of the vehicle 1, to the occupant in an easy-to-understand manner, it is possible to notify the occupant of the mode of movement of the vehicle 1 to the target position along with the situation around the vehicle 1 in an easy-to-understand manner. However, there is room for an improvement in setting the display position of the virtual vehicle image with respect to the real vehicle image in order to further pursue the ease of understanding of notification.

Accordingly, in the embodiment, when the vehicle 1 moves toward a target position, the display processing unit 405 changes a relationship between the display position of a real vehicle image and the display position of a virtual vehicle image according to the remaining distance of the vehicle 1 to the target position. In addition, the remaining distance may be calculated in consideration of the traveling distance of the vehicle 1 estimated using the detection results of various sensors provided in the vehicle 1.

Figure 6:
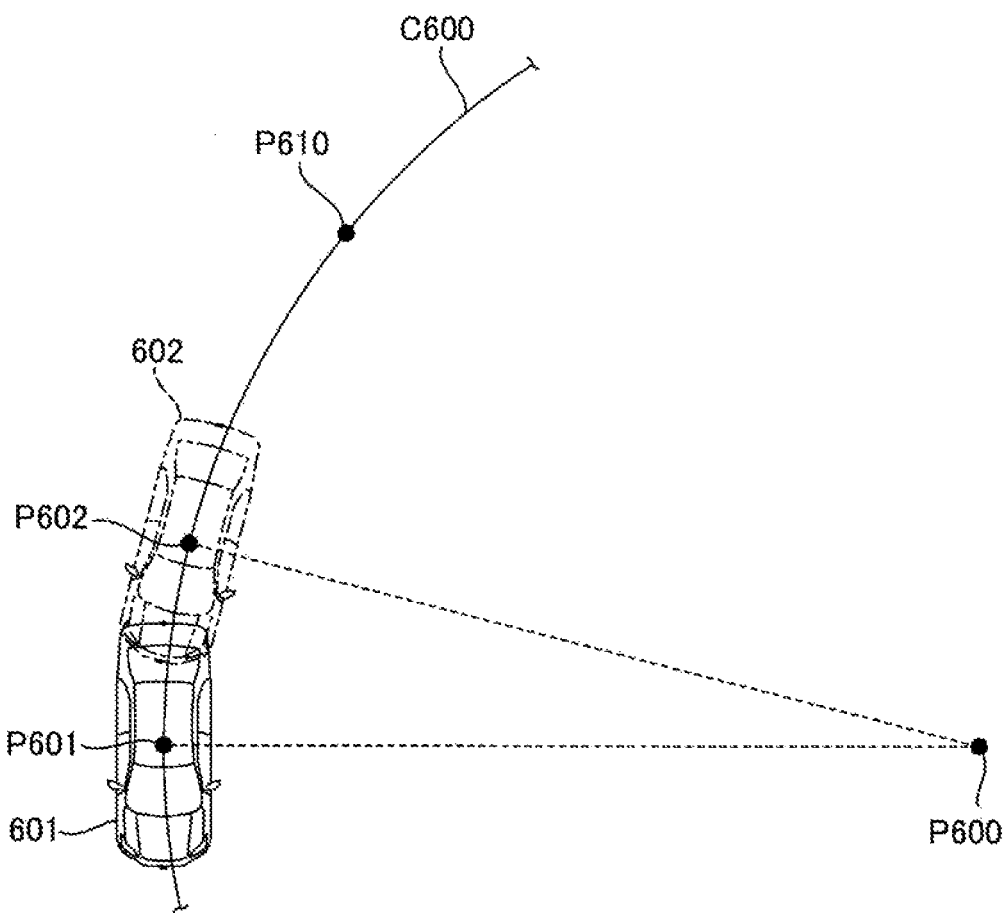
FIG. 6 is an exemplary and schematic image diagram for explaining an example of a relationship between the display position of a real vehicle image and the display position of a virtual vehicle image in the embodiment.
Figure 7:
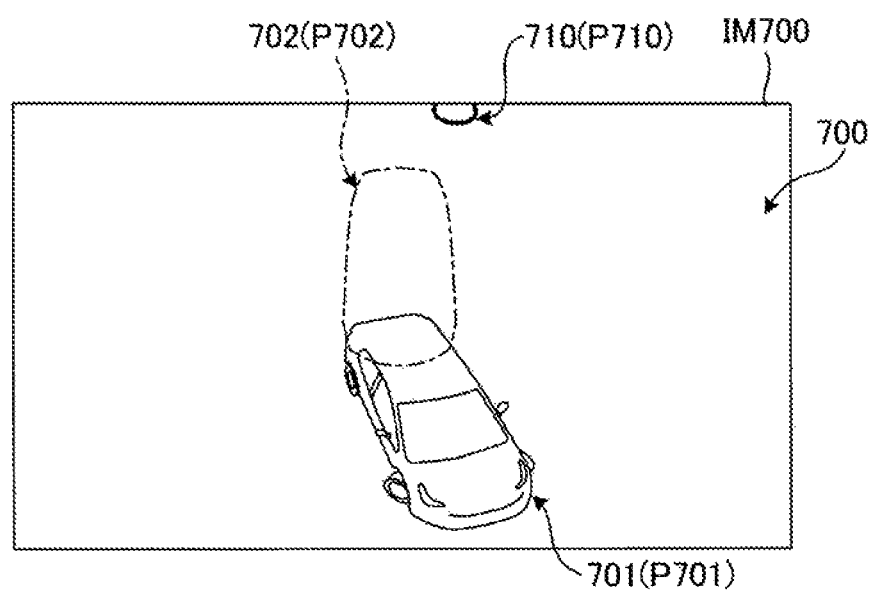
FIG. 7 is an exemplary and schematic diagram illustrating an example of a real vehicle image and a virtual vehicle image displayed on a peripheral image, corresponding to the example illustrated in FIG. 6, in the embodiment.

For example, in the embodiment, as illustrated in FIGS. 6 and 7, the display processing unit 405 maintains a substantially constant distance between the display position of a real vehicle image and the display position of a virtual vehicle image when the remaining distance to a target position exceeds a threshold value (or is greater than or equal to the threshold value).

FIG. 6 is an exemplary and schematic image diagram for explaining an example of a relationship between the display position of a real vehicle image and the display position of a virtual vehicle image in the embodiment. In the example illustrated in FIG. 6, a FIG. 601 corresponds to a real vehicle image, a position P601 corresponds to the display position of the real vehicle image, a FIG. 602 corresponds to a virtual vehicle image, and a position P602 of the FIG. 602 corresponds to the display position of the virtual vehicle image, and a position P610 corresponds to a target position.

As illustrated in FIG. 6, the positions P601, P602, and P610 are arranged on an arc C600 centered on a position P600. In addition, in the embodiment, the arc C600 (and the position P600) may be acquired based on the course of the vehicle 1 that is systematically and appropriately calculated in proxy control (e.g., automatic parking control) executed by the proxy control unit 402, or may be acquired based on the course of the vehicle 1 that is calculated based on the detection result of the steering unit sensor 303c as a steering angle sensor that detects the steering angle of the vehicle 1. Accordingly, in the embodiment, the movement of the vehicle 1 to the target position may be realized under the proxy control by the proxy control unit 402, or may be realized under a manual operation by the driver.

Here, in the embodiment, when the remaining distance (from the position P601) to the position P610 corresponding to the target position exceeds the threshold value, the distance along the arc C600 between the position P601 corresponding to the display position of the real vehicle image and the position P602 corresponding to the display position of the virtual vehicle image is kept substantially constant. Thus, the display processing unit 405 displays the peripheral image including the real vehicle image and the virtual vehicle image in a display mode illustrated in FIG. 7.

FIG. 7 is an exemplary and schematic diagram illustrating an example of a real vehicle image and a virtual vehicle image displayed on a peripheral image, corresponding to the example illustrated in FIG. 6, in the embodiment. In the embodiment, the display processing unit 405 displays an image IM700 illustrated in FIG. 7 on the display unit 8 in a case where a relationship between the display position of a real vehicle image and a target position is as in the example illustrated in FIG. 6.

As illustrated in FIG. 7, the image IM700 includes an image 700 representing a three-dimensional image as an example of a peripheral image, an image 701 representing a real vehicle image superimposed on a position P701 in the image 700, and an image 702 representing a virtual vehicle image superimposed on a position P702 in the image 700 which is spaced apart from the position P701 by a certain distance along an assumed course of the vehicle 1. In addition, in the image IM700 illustrated in FIG. 7, an icon 710 indicating a target position is also displayed at the position P701 corresponding to the target position.

The display mode as described above in which the image 701 representing the real vehicle image and the image 702 representing the virtual vehicle image are displayed as being spaced apart from each other by a certain distance is continued as long as the remaining distance to the target position exceeds a threshold value. Thus, the occupant may easily recognize the remaining distance to the target position by visually confirming the state of separation between the image 701 representing the real vehicle image and the image 702 representing the virtual vehicle image.

In addition, in the example illustrated in FIG. 7, the distance between the display positions of the real vehicle image and the virtual vehicle image is set such that the image 702 representing the virtual vehicle image overlaps with at least a portion of the image 701 representing the real vehicle image, but, in the embodiment, the distance between the display positions of the real vehicle image and the virtual vehicle image may be set such that the image 702 representing the virtual vehicle image and the image 701 representing the real vehicle image are separated from each other without overlapping.

Figure 8:
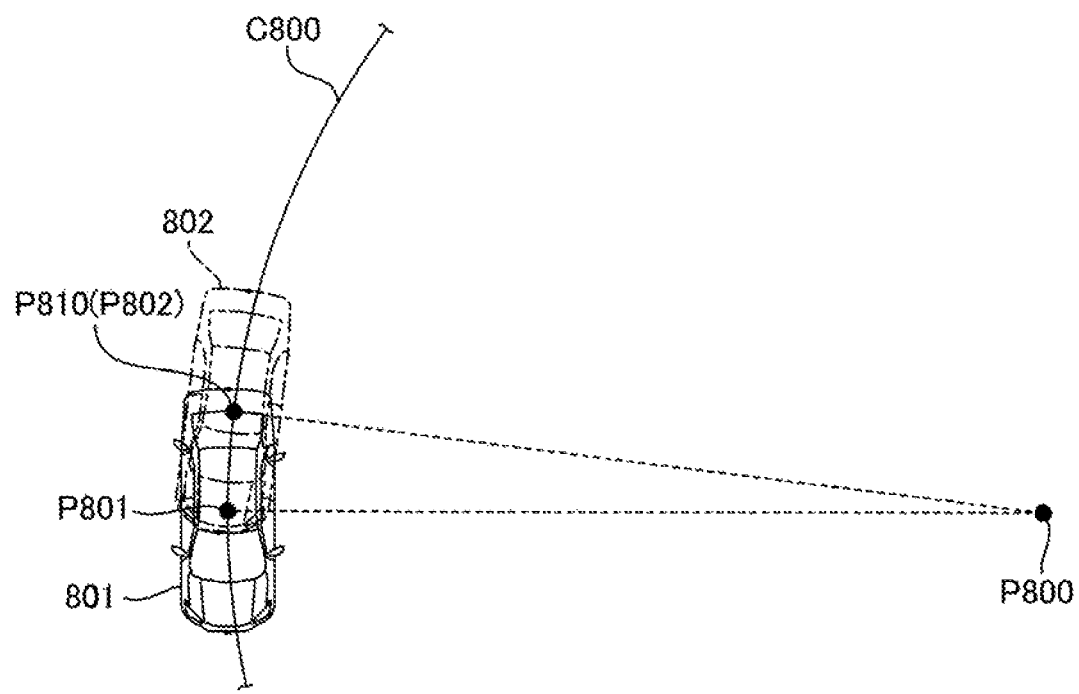
FIG. 8 is an exemplary and schematic image diagram for explaining an example of a relationship between the display position of a real vehicle image and the display position of a virtual vehicle image, different from FIG. 6, in the embodiment.
Figure 9:
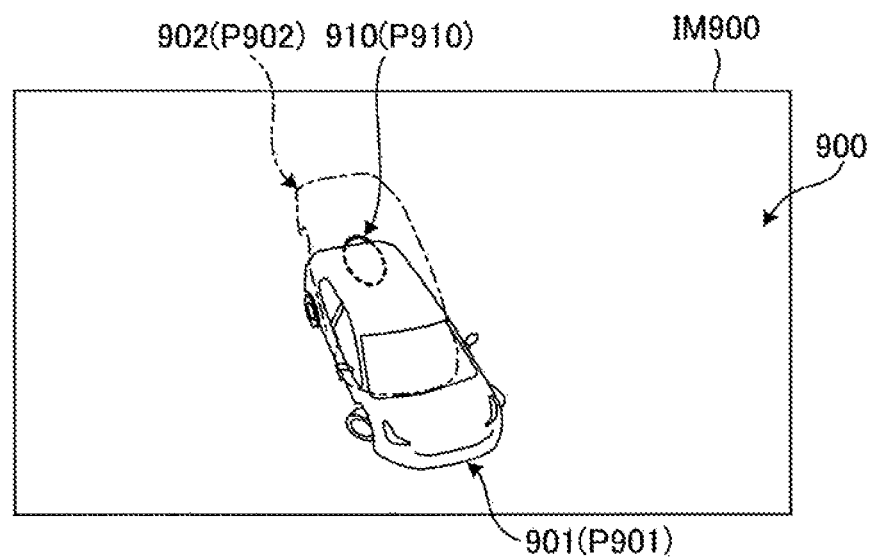
FIG. 9 is an exemplary and schematic diagram illustrating an example of a real vehicle image and a virtual vehicle image displayed on a peripheral image, corresponding to the example illustrated in FIG. 8, in the embodiment.

Meanwhile, in the embodiment, as illustrated in FIGS. 8 and 9, the display processing unit 405 changes the distance between the display position of a real vehicle image and the display position of a virtual vehicle image according to the remaining distance to a target position when the remaining distance is below the threshold value (or is equal to or less than the threshold value).

FIG. 8 is an exemplary and schematic image diagram for explaining an example of a relationship between the display position of a real vehicle image and the display position of a virtual vehicle image, different from FIG. 6, in the embodiment. In the example illustrated in FIG. 8, a FIG. 801 corresponds to a real vehicle image, a position P801 corresponds to the display position of the real vehicle image, a FIG. 802 corresponds to a virtual vehicle image, a position P802 of the FIG. 802 corresponds to the display position of the virtual vehicle image, and a position P810 corresponds to a target position. In addition, in the example illustrated in FIG. 8, the position P802 and the position P810 coincide with each other.

As illustrated in FIG. 8, the positions P801, P802, and P810 are arranged on an arc C800 centered on a position P800. In addition, in the example illustrated in FIG. 8, the arc C800 (and the position P800) may be acquired based on the course of the vehicle 1 that is systematically and appropriately calculated in proxy control, or may be acquired based on the course of the vehicle 1 that is calculated based on the detection result of the steering unit sensor 303c, similarly to the example illustrated in FIG. 6.

Here, in the example illustrated in FIG. 8, the remaining distance (from the position P801) to the position P810 corresponding to the target position is below the threshold value as a result of being reduced compared to the example illustrated in FIG. 6. In such a case, the display processing unit 405 changes the distance between the display position of the real vehicle image and the display position of the virtual vehicle image according to the remaining distance to the target position, rather than maintaining a constant distance between the display position of the real vehicle image and the display position of the virtual vehicle image.

In other words, in the embodiment, the display processing unit 405 maintains a constant distance between the display position of the virtual vehicle image and the display position of the real vehicle image until the display position of the virtual vehicle image reaches the target position, for example, when the remaining distance to the target position exceeds the threshold value, and changes the distance between the display position of the virtual vehicle image and the display position of the real vehicle image according to the remaining distance such that, for example, a state where the display position of the virtual vehicle image has reached the target position is maintained when the remaining distance to the target position is below the threshold value. Thus, the display processing unit 405 displays the peripheral image including the real vehicle image and the virtual vehicle image in a display mode illustrated in FIG. 9.

FIG. 9 is an exemplary and schematic diagram illustrating an example of a real vehicle image and a virtual vehicle image displayed on a peripheral image, corresponding to the example illustrated in FIG. 8, in the embodiment. In the embodiment, the display processing unit 405 displays an image IM900 illustrated in FIG. 9 on the display unit 8 in a case where a relationship between the display position of a real vehicle image and a target position is as in the example illustrated in FIG. 8.

As illustrated in FIG. 9, the image IM900 includes an image 900 representing a three-dimensional image as an example of a peripheral image, an icon 910 indicating a target position superimposed on a position P910 in the image 900, an image 901 representing a real vehicle image superimposed on a position P901 in the image 900, and an image 902 representing a virtual vehicle image superimposed on a position P902 in the image 900 which coincides with the position P910 of the icon 910 indicating the target position.

In the example illustrated in FIG. 9, the distance between the image 901 representing the real vehicle image and the image 902 representing the virtual vehicle image gradually decreases as the vehicle 1 moves. More specifically, as the vehicle 1 moves, the image 901 representing the real vehicle image gradually approaches the image 902 representing the virtual vehicle image which is fixedly displayed at the position P910 as the target position. Thus, the occupant may easily recognize the mode of movement of the vehicle 1 to the target position by visually confirming the mode of approach of the image 901 representing the real vehicle image and the image 902 representing the virtual vehicle image.

In addition, in the embodiment, the timing at which the remaining distance to the target position reaches the threshold value and the timing at which the display position of the virtual vehicle image reaches the target position may not necessarily coincide with each other. For example, in the embodiment, a method of maintaining a constant distance between the display position of a real vehicle image and the display position of a virtual vehicle image until the display position of the virtual vehicle image reaches a position spaced forward apart from a target position by a predetermined distance and thereafter, gradually reducing the distance between the display position of the real vehicle image and the display position of the virtual vehicle image according to the remaining distance such that the timing at which the display position of the real vehicle image reaches the target position and the timing at which the display position of the virtual vehicle image reaches the target position coincide with each other is also conceivable.

Incidentally, in the embodiment, as described above, the real vehicle image and the virtual vehicle image may be generated after differentiating the shape, color, brightness, or transmittance thereof. Thus, in the embodiment, the virtual vehicle image may be displayed in a state where the content (background) other than the vehicle 1 displayed in the peripheral image is viewed through the virtual vehicle image. In such a case, when the colors or brightnesses of the real vehicle image, the virtual vehicle image, and the peripheral image are similar to each other, the differentiability of each image is deteriorated.

Figure 10:
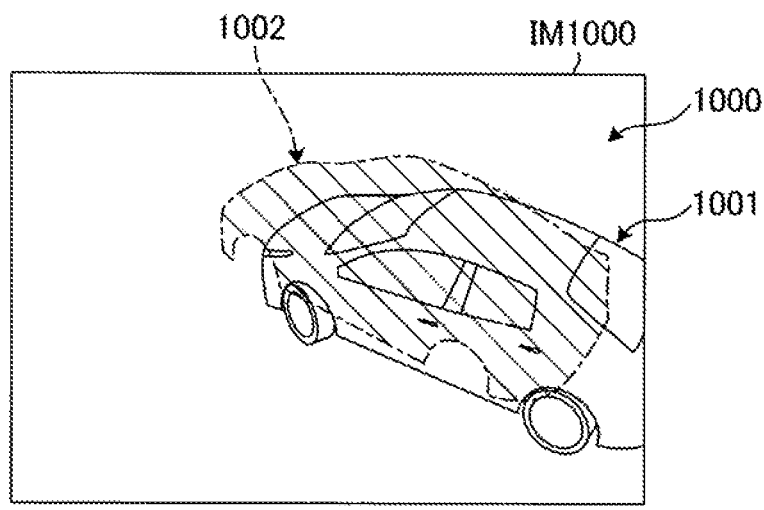
FIG. 10 is an exemplary and schematic diagram illustrating an example of a display mode of a real vehicle image and a virtual vehicle image on a peripheral image according to the embodiment.
Figure 11:
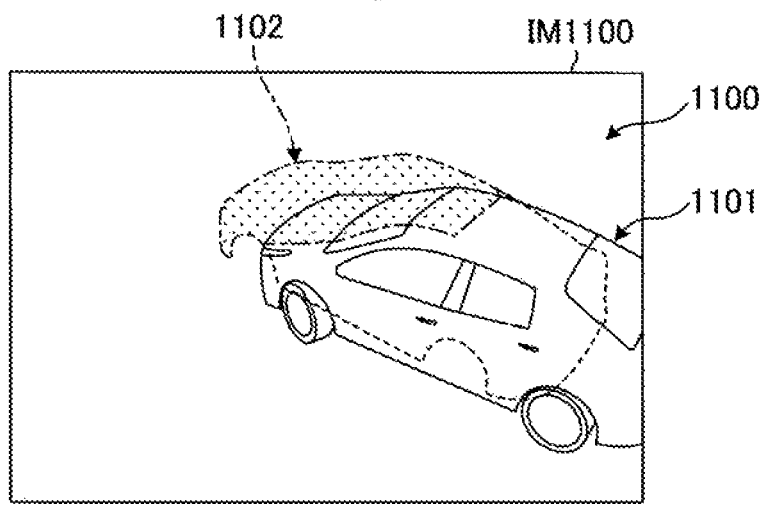
FIG. 11 is an exemplary and schematic diagram illustrating an example of adjustment of the color (and/or brightness) of a virtual vehicle image that may be executed in the embodiment.

Accordingly, in the embodiment, the display processing unit 405 improves the differentiability of each of a real vehicle image, a virtual vehicle image, and a peripheral image using one or a combination of the methods illustrated in FIGS. 10 and 11.

First, a method of improving the differentiability of a virtual vehicle image with respect to a real vehicle image will be described. In the embodiment, the display processing unit 405 may improve the differentiability of a virtual vehicle image with respect to a real vehicle image by displaying the real vehicle image and the virtual vehicle image in a display mode like an image IM1000 illustrated in FIG. 10.

FIG. 10 is an exemplary and schematic diagram illustrating an example of a display mode of a real vehicle image and a virtual vehicle image on a peripheral image according to the embodiment. In the example illustrated in FIG. 10, the image IM1000 is configured by superimposing an image 1001 representing a real vehicle image and an image 1002 representing a virtual vehicle image on an image 1000 representing a three-dimensional image as an example of a peripheral image. Further, the image 1001 representing the real vehicle image and the image 1002 representing the virtual vehicle image are displayed as 3D polygons which partially overlap each other.

As illustrated in FIG. 10, in the embodiment, the display processing unit 405 may display a real vehicle image and a virtual vehicle image in a display mode in which an overlapping portion between the real vehicle image and the virtual vehicle image is identifiable. More specifically, the display processing unit 405 does not execute a hidden surface removal processing on the overlapping portion between the real vehicle image and the virtual vehicle image, so that the overlapping portion may be displayed in a display mode in which both the real vehicle image and the virtual vehicle image are identifiable. According to such a display mode, for example, even when the difference in color (and/or brightness) between a real vehicle image and a virtual vehicle image is relatively small, it is possible to make it easy to recognize the positional deviation between the real vehicle image and the virtual vehicle image.

However, for example, when the difference in color (and/or brightness) between a real vehicle image and a virtual vehicle image is relatively large, there may be no major inconvenience even if the hidden surface removal processing is executed on an overlapping portion between the real vehicle image and the virtual vehicle image. Accordingly, in the embodiment, the display processing unit 405 may selectively switch between displaying an overlapping portion between a real vehicle image and a virtual vehicle image in a display mode in which either one of the real vehicle image and the virtual vehicle image is identifiable by executing a hidden surface removal processing on the overlapping portion and displaying the overlapping portion between the real vehicle image and the virtual vehicle image in a display mode in which both the real vehicle image and the virtual vehicle image are identifiable by executing no hidden surface removal processing on the overlapping portion.

Next, a method of improving the differentiability of a virtual vehicle image with respect to a peripheral image will be described. In the embodiment, the display processing unit 405 may improve the differentiability of a virtual vehicle image with respect to a peripheral image by appropriately adjusting the color (and/or brightness) of the virtual vehicle image in a display mode like an image IM1100 illustrated in FIG. 11.

FIG. 11 is an exemplary and schematic diagram illustrating an example of adjustment of the color (and/or brightness) of a virtual vehicle image that may be executed in the embodiment. In the example illustrated in FIG. 11, the image IM1100 is configured by superimposing an image 1101 representing a real vehicle image and an image 1102 representing a virtual vehicle image on an image 1100 representing a three-dimensional image as an example of a peripheral image.

As illustrated in FIG. 11, in the embodiment, when the difference in color (and/or brightness) between a virtual vehicle image and a peripheral portion of a peripheral image around the virtual vehicle image is relatively small, the display processing unit 405 may adjust the color (and/or brightness) of the virtual vehicle image such that the difference becomes, for example, a certain level or more. According to such a display mode, for example, even when the difference in color (and/or brightness) between the virtual vehicle image and the peripheral portion is relatively small, it is possible to clearly differentiate the virtual vehicle image and the peripheral portion.

In addition, in the example illustrated in FIG. 11, a hidden surface removal processing is executed on an overlapping portion of the image 1101 representing the real vehicle image and the image 1102 representing the virtual vehicle image, but it goes without saying that the hidden surface removal processing needs not to be executed on the overlapping portion. In the latter case, the overall color (and/or brightness) of the virtual vehicle image including the overlapping portion with the real vehicle image may be adjusted collectively.

Further, the adjustment of the color of the virtual vehicle image as described above may also be used to notify a driver's driving operation error when the vehicle 1 moves by manual driving, in addition to differentiation between the virtual vehicle image and the peripheral portion. The display position of the virtual vehicle image is determined based on the detection result of the steering unit sensor 303*c* as a steering angle sensor that detects the steering angle of the vehicle 1, for example, when the vehicle 1 moves by manual driving, but, when the determined display position is out of the course to be reached to the target position, changing the color of the virtual vehicle image to alert the driver is useful because it may notify a driver's driving operation error.

By the way, when the color (and/or brightness) of the virtual vehicle image is appropriately adjusted by the method illustrated in FIG. 11, it is assumed that the difference in color (and/or brightness) between the virtual vehicle image and the real vehicle image becomes relatively small and the differentiability of the real vehicle image with respect to the virtual vehicle image is deteriorated.

Figure 12:
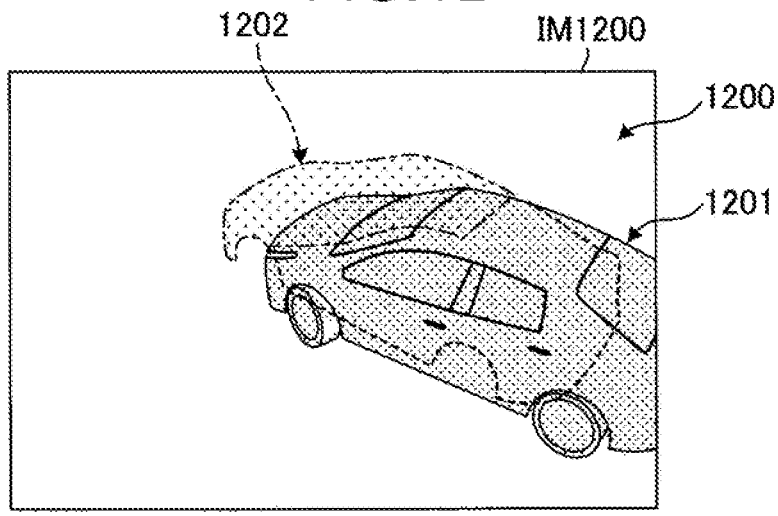
FIG. 12 is an exemplary and schematic diagram illustrating an example of adjustment of the color (and/or brightness) of a real vehicle image that may be executed in the embodiment.

Accordingly, in the embodiment, the display processing unit 405 may achieve both an improvement in the differentiability of a virtual vehicle image with respect to a peripheral image and an improvement in the differentiability of a real vehicle image with respect to the virtual vehicle image by appropriately adjusting the color (and/or brightness) of the real vehicle image in a display mode like an image IM1200 illustrated in FIG. 12.

FIG. 12 is an exemplary and schematic diagram illustrating an example of adjustment of the color (and/or brightness) of a real vehicle image that may be executed in the embodiment. In the example illustrated in FIG. 12, the image IM1200 is configured by superimposing an image 1201 representing a real vehicle image and an image 1202 representing a virtual vehicle image on an image 1200 representing a three-dimensional image as an example of a peripheral image.

As illustrated in FIG. 12, in the embodiment, when the difference in color (and/or brightness) between a virtual vehicle image and a real vehicle image becomes relatively small as a result of adjustment of the color (and/or brightness) of the virtual vehicle image, the display processing unit 405 may adjust the color (and/or brightness) of the real vehicle image such that the difference becomes, for example, a certain level or more. According to such a display mode, it is possible to clearly differentiate the virtual vehicle image and the real vehicle image.

In addition, as in the example illustrated in FIG. 11, in the example illustrated in FIG. 12, a hidden surface removal processing is executed on an overlapping portion between the image 1201 representing the real vehicle image and the image 1202 representing the virtual vehicle image, but it goes without saying that the hidden surface removal processing needs not to be executed on the overlapping portion.

Hereinafter, a processing executed by the display control device 400 according to the embodiment will be described with reference to FIG. 13.

Figure 13:
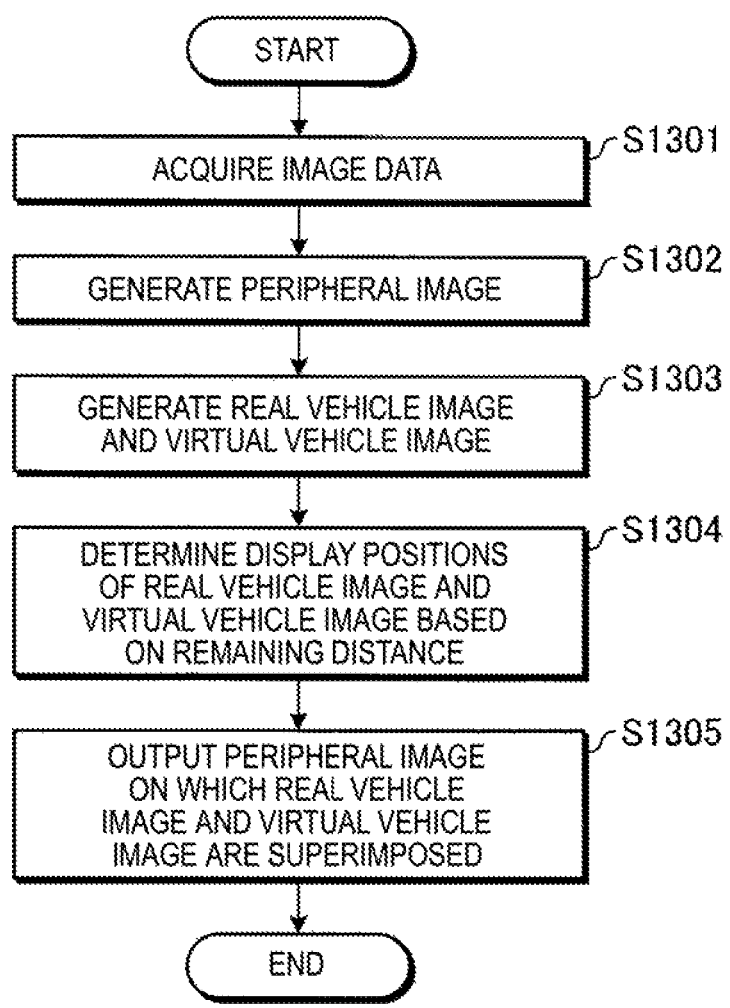
FIG. 13 is an exemplary and schematic flowchart illustrating a series of processings executed by the display control device according to the embodiment to display a real vehicle image and a virtual vehicle image.

FIG. 13 is an exemplary and schematic flowchart illustrating a series of processings executed by the display control device 400 according to the embodiment to display a real vehicle image and a virtual vehicle image. The series of processings illustrated in FIG. 13 are repeatedly executed under a situation where monitoring the periphery of the vehicle 1 is required.

As illustrated in FIG. 13, in the embodiment, first, in step S1301, the image data acquisition unit 403 of the display control device 400 acquires image data as a result of imaging by the in-vehicle camera 15.

Then, in step S1302, the image generation unit 404 of the display control device 400 generates a peripheral image as one of images to be displayed on the display unit 8. As described above, the peripheral image includes a three-dimensional image, a bird's eye view image, a single camera image, or the like.

Then, in step S1303, the image generation unit 404 of the display control device 400 generates a real vehicle image and a virtual vehicle image to be superimposed on the peripheral image. As described above, the real vehicle image is an image indicating the current state of the vehicle 1, and the virtual vehicle image is an image indicating the future state of the vehicle 1. These images are calculated based on the detection results of various sensors provided in the vehicle 1 or the content of proxy control executed by the proxy control unit 402.

Then, in step S1304, the display processing unit 405 of the display control device 400 determines the display positions of the real vehicle image and the virtual vehicle image based on the remaining distance to a target position. More specifically, the display processing unit 405 maintains a substantially constant distance between the display position of the real vehicle image and the display position of the virtual vehicle image when the remaining distance to the target position exceeds a threshold value, and changes the distance between the display position of the real vehicle image and the display position of the virtual vehicle image according to the remaining distance when the remaining distance to the target position is below the threshold value.

Then, in step S1305, the display processing unit 405 of the display control device 400 outputs the peripheral image on which the real vehicle image and the virtual vehicle image are superimposed to the display unit 8. Then, the processing is terminated.

As described above, the display control device 400 according to the embodiment includes the image data acquisition unit 403 and the display processing unit 405. The image data acquisition unit 403 acquires image data as a result of imaging by the in-vehicle camera 15 as an imaging unit that images the situation around the vehicle 1. When the vehicle 1 moves toward the target position, the display processing unit 405 displays, on the display unit 8, a peripheral image indicating the situation around the vehicle 1 generated based on the image data, and displays, on the peripheral image, a real vehicle image as a first vehicle image indicating the current state of the vehicle 1 and a virtual vehicle image as a second vehicle image indicating the future state of the vehicle 1. Then, the display processing unit 405 changes a relationship between the display position of the real vehicle image and the display position of the virtual vehicle image according to the remaining distance to the target position of the vehicle 1.

According to the configuration as described above, it is possible to notify the occupant of the mode of movement of the vehicle 1 to the target position along with the situation around the vehicle 1 in an easy-to-understand manner by the peripheral image on which the real vehicle image and the virtual vehicle image, the display positions of which change according to the remaining distance to the target position, are displayed.

In the display control device 400 according to the embodiment, the display processing unit 405 maintains a substantially constant distance between the display position of the real vehicle image and the display position of the virtual vehicle image when the remaining distance exceeds a threshold value, and changes the distance between the display position of the real vehicle image and the display position of the virtual vehicle image according to the remaining distance when the remaining distance is below the threshold value. According to this configuration, it is possible to notify the occupant of the degree of approach of the vehicle 1 to the target position in an easy-to-understand manner based on whether or not there is a change in the distance between the display position of the real vehicle image and the display position of the virtual vehicle image.

In addition, in the display control device 400 according to the embodiment, the display processing unit 405 may display the virtual vehicle image on a virtual course in the peripheral image calculated based on a virtual arc that interconnects the current position of the vehicle 1 and the target position. According to this configuration, it is possible to display the virtual vehicle image at an appropriate position corresponding to the future of the vehicle 1 in consideration of the virtual arc that interconnects the current position of the vehicle 1 and the target position.

Further, in the display control device 400 according to the embodiment, the display processing unit 405 may display the virtual vehicle image on a virtual course in the peripheral image calculated based on a detection result of the steering unit sensor 303c as a steering angle sensor that detects a steering angle of the vehicle 1. According to this configuration, it is possible to display the virtual vehicle image at an appropriate position corresponding to the future of the vehicle 1 in consideration of the detection result of the steering angle sensor.

Further, in the display control device 400 according to the embodiment, the display processing unit 405 may display the virtual vehicle image so as to overlap with at least a portion of the real vehicle image. According to this configuration, it is possible to prevent the virtual vehicle image from being misidentified as an image indicating the state of another vehicle.

Further, in the display control device 400 according to the embodiment, the display processing unit 405 may display the real vehicle image and the virtual vehicle image in a display mode in which an overlapping portion between the real vehicle image and the virtual vehicle image is identifiable. More specifically, the display processing unit 405 may display the real vehicle image and the virtual vehicle image without executing a hidden surface removal processing on the overlapping portion between the real vehicle image and the virtual vehicle image when displaying the real vehicle image and the virtual vehicle image as 3D polygons. According to this configuration, it is possible to make it easy to identify the positional deviation between the real vehicle image and the virtual vehicle image.

Further, in the display control device 400 according to the embodiment, the display processing unit 405 may adjust at least one of the color and the brightness of the virtual vehicle image according to at least one of the difference between the color of the virtual vehicle image and the color of a peripheral portion of the peripheral image around the virtual vehicle image and the difference between the brightness of the virtual vehicle image and the brightness of the peripheral portion. According to this configuration, it is possible to make it easy to identify the virtual vehicle image and the peripheral portion, for example, even when the difference in color and/or brightness between the virtual vehicle image and the peripheral image (peripheral portion) is relatively small.

Further, in the display control device 400 according to the embodiment, the display processing unit 405 generates the real vehicle image based on the overall shape of the vehicle 1 including wheels, and generates the virtual vehicle image based on the shape of the vehicle body 2 of the vehicle 1 including no wheels. According to this configuration, it is possible to make it easy to identify that the virtual vehicle image does not indicate the current state of the vehicle 1.

Further, in the display control device 400 according to the embodiment, the display processing unit 405 may change a relationship between the display position of the real vehicle image and the display position of the virtual vehicle image according to the remaining distance when the vehicle 1 moves toward the target position under proxy control that executes at least a part of a driving operation of the vehicle by the driver. According to this configuration, it is possible to notify the occupant of the mode of movement of the vehicle 1 to the target position under the proxy control along with the situation around the vehicle 1 in an easy-to-understand manner.

Further, in the display control device 400 according to the embodiment, the target position is a parking position where the vehicle 1 finally reaches in automatic parking control as the proxy control or a quick-turn position where there is a possibility of the vehicle 1 temporarily stopping before reaching the parking position. According to this configuration, it is possible to notify the occupant of the mode of movement of the vehicle 1 to the parking position or the quick-turn position along with the situation around the vehicle 1 in an easy-to-understand manner.

In addition, a display control program executed in the control device 310 according to the embodiment may be provided or distributed via a network such as the Internet. In other words, the display control program executed in the control device 310 according to the embodiment may be provided in a form in which it accepts a download via a network such as the Internet in a state of being stored on a computer connected to the network.

<Modifications>

In the embodiment described above, as an example, a technique of changing a relationship between the display position of a real vehicle image and the display position of a virtual vehicle image according to the remaining distance to a target position is illustrated. However, the technique disclosed here is not limited to the technique of changing the relationship between the display positions of the real vehicle image and the virtual vehicle image according to the remaining distance, and also includes a technique of changing a display mode other than the display position, for example, the color, brightness, or transmittance of at least one of the real vehicle image and the virtual vehicle image according to the remaining distance. By the latter technique, as in the former technique, it is possible to notify the occupant of the mode of movement of a vehicle to a target position along with the situation around the vehicle in an easy-to-understand manner by changing the display mode of at least one of the real vehicle image and the virtual vehicle image on the peripheral image according to the remaining distance.

For example, as an example of a technique of changing the color according to the remaining distance, a technique of gradually changing the color of a virtual vehicle image (and/or a real vehicle image) from gray to white as the remaining distance decreases is conceivable. Further, as an example of a technique of changing the brightness according to the remaining distance, a technique of gradually changing the brightness of a virtual vehicle image (and/or a real vehicle image) from a dark state to a bright state as the remaining distance decreases is conceivable. Further, as an example of a technique of changing the transmittance according to the remaining distance, a technique of gradually changing the transmittance of a virtual vehicle image (and/or a real vehicle image) from a high value to a low value as the remaining distance decreases is conceivable. Each of these three techniques may be used alone, or may be used as a combination of one or more of four techniques including the technique as in the above-described embodiment of changing the display position according to the remaining distance.

A display control device as an aspect of this disclosure includes an image data acquisition unit configured to acquire image data as a result of imaging by an imaging unit that images a situation around a vehicle and a display processing unit configured to display, on a display unit, a peripheral image indicating the situation around the vehicle generated based on the image data and also display, on the peripheral image, a first vehicle image indicating a current state of the vehicle and a second vehicle image indicating a future state of the vehicle when the vehicle moves toward a target position and to change a display mode of at least one of the first vehicle image and the second vehicle image according to a remaining distance to the target position of the vehicle.

According to the display control device described above, it is possible to notify an occupant of the mode of movement of the vehicle to the target position along with the situation around the vehicle in an easy-to-understand manner by changing the display mode of at least one of the first vehicle image and the second vehicle image according to the remaining distance.

In the display control device described above, the display processing unit may execute a change in a relationship between a display position of the first vehicle image and a display position of the second vehicle image as a change in the display mode of at least one of the first vehicle image and the second vehicle image. According to this configuration, it is possible to visually express the mode of movement of the vehicle in an easy-to-understand manner by changing the relationship between the display position of the first vehicle image and the display position of the second vehicle image according to the remaining distance.

In this case, the display processing unit may maintain a substantially constant distance between the display position of the first vehicle image and the display position of the second vehicle image when the remaining distance exceeds a threshold value, and change the distance between the display position of the first vehicle image and the display position of the second vehicle image according to the remaining distance when the remaining distance is below the threshold value. According to this configuration, it is possible to notify the occupant of the degree of approach of the vehicle to the target position in an easy-to-understand manner based on whether or not there is a change in the distance between the display position of the first vehicle image and the display position of the second vehicle image.

Further, in the display control device described above, the display processing unit may display the second vehicle image on a virtual course in the peripheral image calculated based on a virtual arc that interconnects a current position of the vehicle and the target position. According to this configuration, it is possible to display the second vehicle image at an appropriate position corresponding to the future of the vehicle in consideration of the virtual arc that interconnects the current position of the vehicle and the target position.

Further, in the display control device described above, the display processing unit may display the second vehicle image on a virtual course in the peripheral image calculated based on a detection result of a steering angle sensor that detects a steering angle of the vehicle. According to this configuration, it is possible to display the second vehicle image at an appropriate position corresponding to the future of the vehicle in consideration of the detection result of the steering angle sensor.

Further, in the display control device described above, the display processing unit may display the second vehicle image so as to overlap with at least a portion of the first vehicle image. According to this configuration, it is possible to prevent the second vehicle image from being misidentified as an image indicating the state of another vehicle.

In this case, the display processing unit may display the first vehicle image and the second vehicle image in a display mode in which an overlapping portion between the first vehicle image and the second vehicle image is identifiable. According to this configuration, it is possible to easily identify the positional deviation between the first vehicle image and the second vehicle image.

Further, in this case, the display processing unit may display the first vehicle image and the second vehicle image without executing a hidden surface removal processing on the overlapping portion between the first vehicle image and the second vehicle image when displaying the first vehicle image and the second vehicle image as 3D polygons. According to this configuration, it is possible to make it easy to identify the positional deviation between the first vehicle image and the second vehicle image.

In addition, in the display control device described above, the display processing unit may adjust at least one of a color and a brightness of the second vehicle image according to at least one of a difference between the color of the second vehicle image and a color of a peripheral portion of the peripheral image around the second vehicle image and a difference between the brightness of the second vehicle image and a brightness of the peripheral portion. According to this configuration, it is possible to make it easy to identify the second vehicle image and the peripheral portion, for example, even when the difference in color and/or brightness between the second vehicle image and the peripheral image (peripheral portion) is relatively small.

Further, in the display control device described above, the display processing unit may generate the first vehicle image based on an overall shape of the vehicle including a wheel, and generates the second vehicle image based on a shape of a vehicle body of the vehicle including no wheel. According to this configuration, it is possible to make it easy to identify that the second vehicle image does not indicate the current state of the vehicle.

In the display control device described above, the display processing unit may change the display mode of at least one of the first vehicle image and the second vehicle image according to the remaining distance when the vehicle moves toward the target position under proxy control that executes at least a part of a driving operation of the vehicle by a driver. According to this configuration, it is possible to notify the occupant of the mode of movement of the vehicle to the target position under the proxy control along with the situation around the vehicle in an easy-to-understand manner.

In this case, the target position may be a parking position where the vehicle finally reaches in automatic parking control as the proxy control or a quick-turn position where there is a possibility of the vehicle temporarily stopping before reaching the parking position. According to this configuration, it is possible to notify the occupant of the mode of movement of the vehicle to the parking position or the quick-turn position along with the situation around the vehicle in an easy-to-understand manner.

Although the embodiments and modifications disclosed here have been exemplified above, the above-described embodiments and modifications thereof are merely given by way of example, and are not intended to limit the scope of this disclosure. Such novel embodiments and modifications may be implemented in various other modes, and various omissions, substitutions, combinations, and changes thereof may be made without departing from the gist of this disclosure. In addition, the embodiments and modifications may be included in the scope and gist of this disclosure and are included in the disclosure described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A display control device comprising:
   an image data acquisition unit configured to acquire image data as a result of imaging by an imaging unit that images a situation around a vehicle; and
   a display processing unit configured to display, on a display unit, a peripheral image indicating the situation around the vehicle generated based on the image data and also display, on the peripheral image,
   a first vehicle image indicating a current state of the vehicle and a second vehicle image indicating a future state of the vehicle when the vehicle moves toward a parking target position,
   wherein the display processing unit maintains a constant distance between the display position of the first vehicle image and the display position of the second vehicle image when a remaining distance to the parking target position of the vehicle exceeds a threshold value, and changes the distance between the display position of the first vehicle image and the display position of the second vehicle image according to the remaining distance when the remaining distance to the parking target position of the vehicle is below the threshold value.

2. The display control device according to claim 1, wherein
   the display processing unit displays the second vehicle image on a virtual course in the peripheral image calculated based on a virtual arc that interconnects a current position of the vehicle and the target position.

3. The display control device according to claim 1, wherein
   the display processing unit displays the second vehicle image on a virtual course in the peripheral image calculated based on a detection result of a steering angle sensor that detects a steering angle of the vehicle.

4. The display control device according to claim 1, wherein
   the display processing unit displays the second vehicle image so as to overlap with at least a portion of the first vehicle image.

5. The display control device according to claim 4, wherein
   the display processing unit displays the first vehicle image and the second vehicle image in a display mode in which an overlapping portion between the first vehicle image and the second vehicle image is identifiable.

6. The display control device according to claim 5, wherein
   the display processing unit displays the first vehicle image and the second vehicle image without executing a hidden surface removal processing on the overlapping portion between the first vehicle image and the second vehicle image when displaying the first vehicle image and the second vehicle image as 3D polygons.

7. The display control device according to claim 1, wherein
   the display processing unit adjusts at least one of a color and a brightness of the second vehicle image according to at least one of a difference between the color of the second vehicle image and a color of a peripheral portion of the peripheral image around the second vehicle image and a difference between the brightness of the second vehicle image and a brightness of the peripheral portion.

8. The display control device according to claim 1, wherein
   the display processing unit generates the first vehicle image based on an overall shape of the vehicle including a wheel, and generates the second vehicle image based on a shape of a vehicle body of the vehicle including no wheel.

9. The display control device according to claim 1, wherein
   the display processing unit changes the display mode of at least one of the first vehicle image and the second vehicle image according to the remaining distance when the vehicle moves toward the target position under proxy control that executes at least a part of a driving operation of the vehicle by a driver.

10. The display control device according to claim 9, wherein
    the target position is a parking position where the vehicle finally reaches in automatic parking control as the proxy control or a quick-turn position where there is a possibility of the vehicle temporarily stopping before reaching the parking position.

\* \* \* \* \*